United States Patent
Shingu et al.

[11] Patent Number: 5,824,178
[45] Date of Patent: Oct. 20, 1998

[54] PREPARATION OF LAMINATED SHEETS

[75] Inventors: Jyunichi Shingu; Katsuyuki Morita, both of Aichi; Toshihiro Toyoda, Hyogo; Shinji Tachihara, Aichi; Kojiro Motai; Satoru Kishi, both of Kanagawa, all of Japan

[73] Assignee: Mitsui Chemicals, Inc., Tokyo, Japan

[21] Appl. No.: 638,786

[22] Filed: Apr. 29, 1996

[30] Foreign Application Priority Data

May 1, 1995 [JP] Japan .................................. 7-107337

[51] Int. Cl.⁶ .............................. B32B 5/12; B29C 35/00
[52] U.S. Cl. .......................... 156/265; 156/269; 156/177; 156/178; 156/179; 156/266; 156/301; 156/303; 156/498; 156/512; 156/519; 156/361
[58] Field of Search .................................... 156/177, 176, 156/178, 266, 265, 242, 303, 300, 562, 563, 512, 519, 179, 552, 361, 210, 205, 498, 269, 324, 301; 242/548.2, 534.1; 425/373

[56] References Cited

U.S. PATENT DOCUMENTS

| | | | |
|---|---|---|---|
| 1,858,436 | 5/1932 | Dickhaut | 242/530 |
| 3,150,022 | 9/1964 | Vida | 156/73.6 |
| 3,155,558 | 11/1964 | Clapp | 156/94 |
| 3,578,544 | 5/1971 | Thorsrud | 428/113 |
| 4,256,522 | 3/1981 | Britton | 156/178 |
| 5,141,583 | 8/1992 | Held | 156/324 |
| 5,149,394 | 9/1992 | Held | 156/555 |
| 5,389,183 | 2/1995 | Seki et al. | 156/359 |
| 5,571,368 | 11/1996 | Barge | 156/359 |
| 5,602,747 | 2/1997 | Rajala | 364/469.01 |

FOREIGN PATENT DOCUMENTS

| | | | |
|---|---|---|---|
| 0363794 | 10/1989 | European Pat. Off. | 156/555 |
| 1901404 | 9/1969 | Germany | 428/113 |
| WO94/02306 | 2/1994 | WIPO | 156/324 |
| WO95/00318 | 5/1995 | WIPO | 156/178 |

*Primary Examiner*—David A. Simmons
*Assistant Examiner*—Linda L. Gray
*Attorney, Agent, or Firm*—Burns, Doane, Swecker & Mathis, L.L.P.

[57] ABSTRACT

A process for making a laminated sheet by cutting a fiber-reinforced thermoplastic resin sheet into a plurality of cut sheets. The cut sheets are feed to a butting apparatus to bring adjacent end faces of the cut sheets against each other. The abutted cut sheets are joined to a continuous sheet, which is a fiber-reinforced thermoplastic resin sheet, by melt welding using a heated roller where the cut sheets and the continuous sheet cling to the heated roller. Cooling of the joined cut sheets and continuous sheet occurs by causing such to cling to a cooling roller. A correcting roller is moved along the cooling roller, where the joined cut sheets and continuous sheet are between the cooling roller and the correcting roller, so that the amount of contact arc between the joined cut sheets and continuous sheet is changed to adjust the amount of warp in the joined cut sheets and continuous sheet.

17 Claims, 13 Drawing Sheets

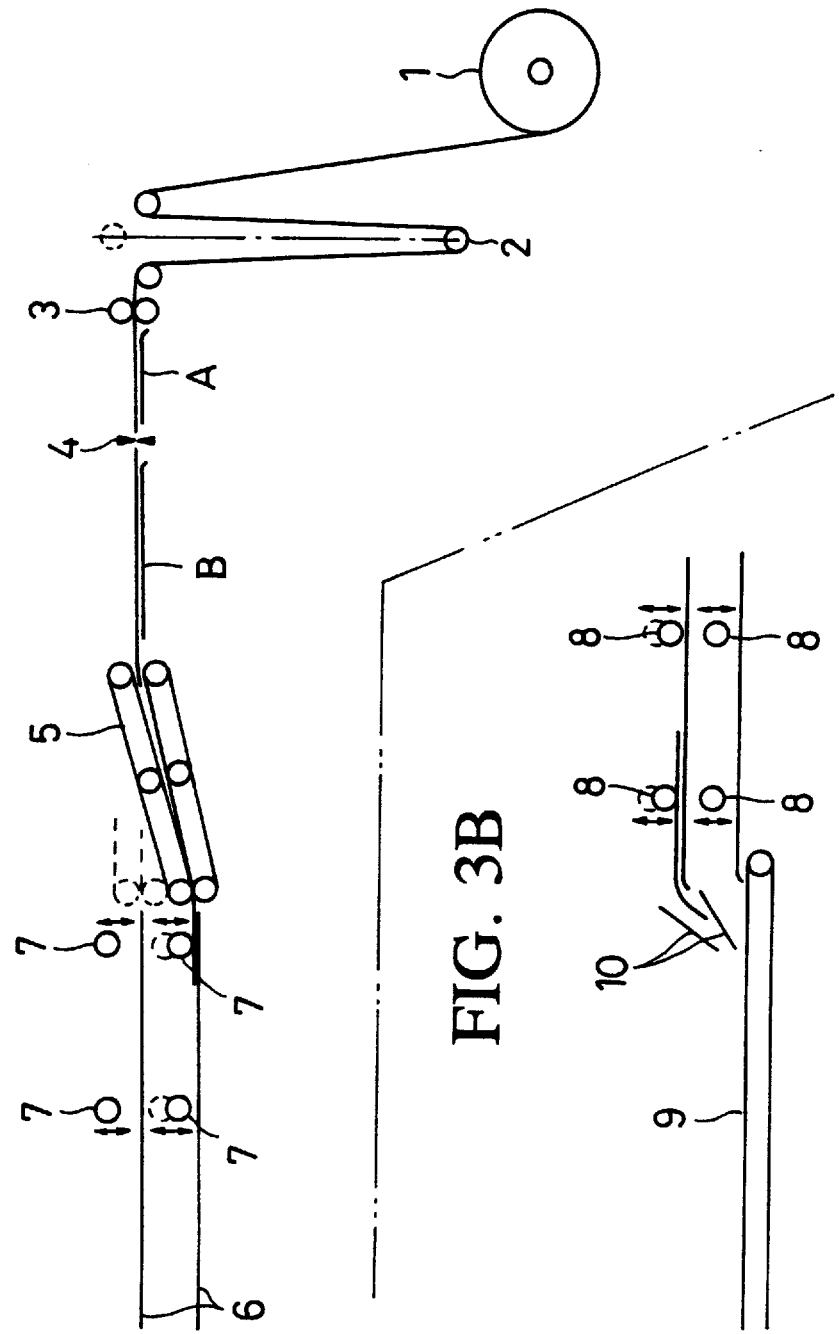

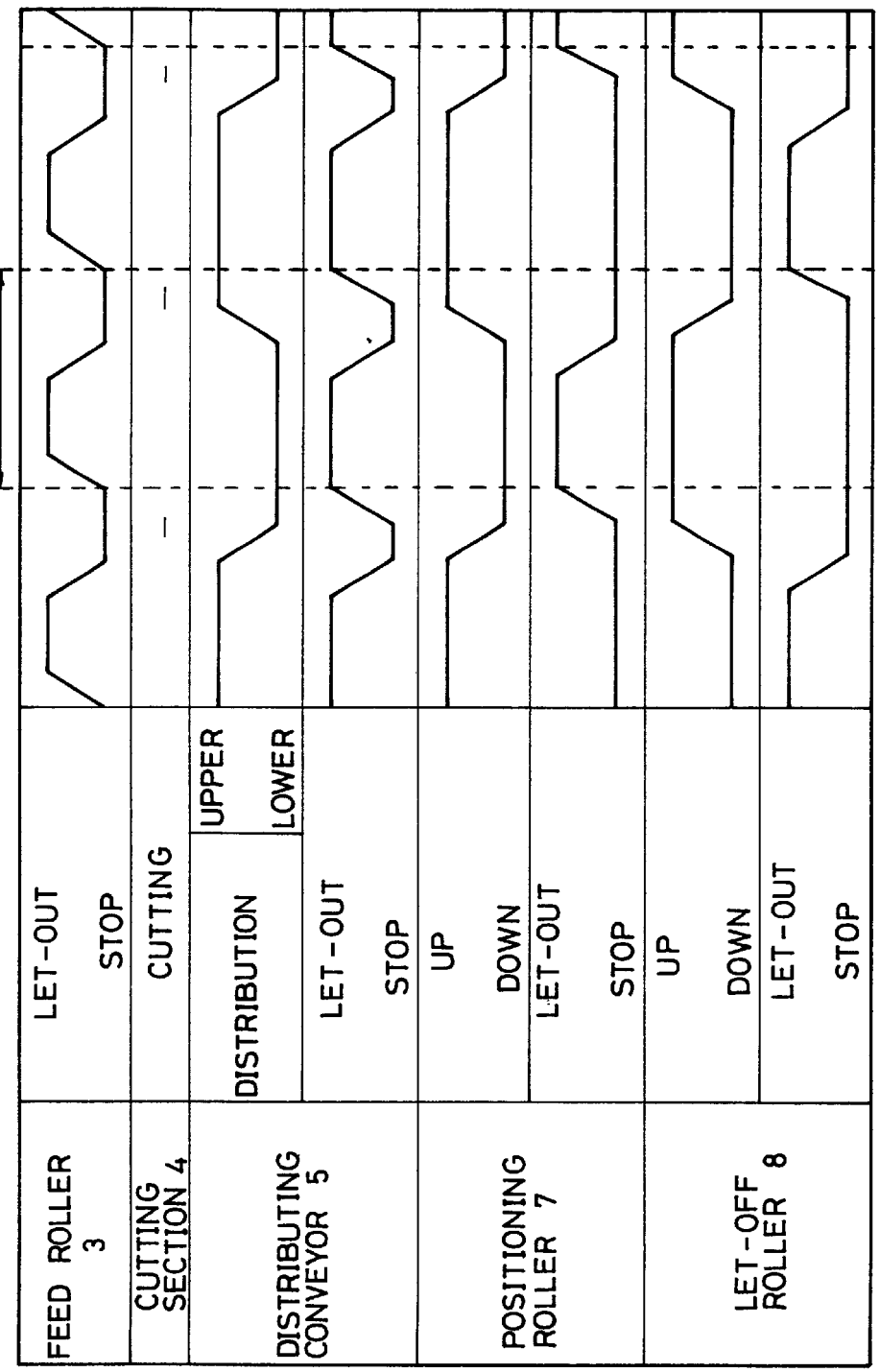

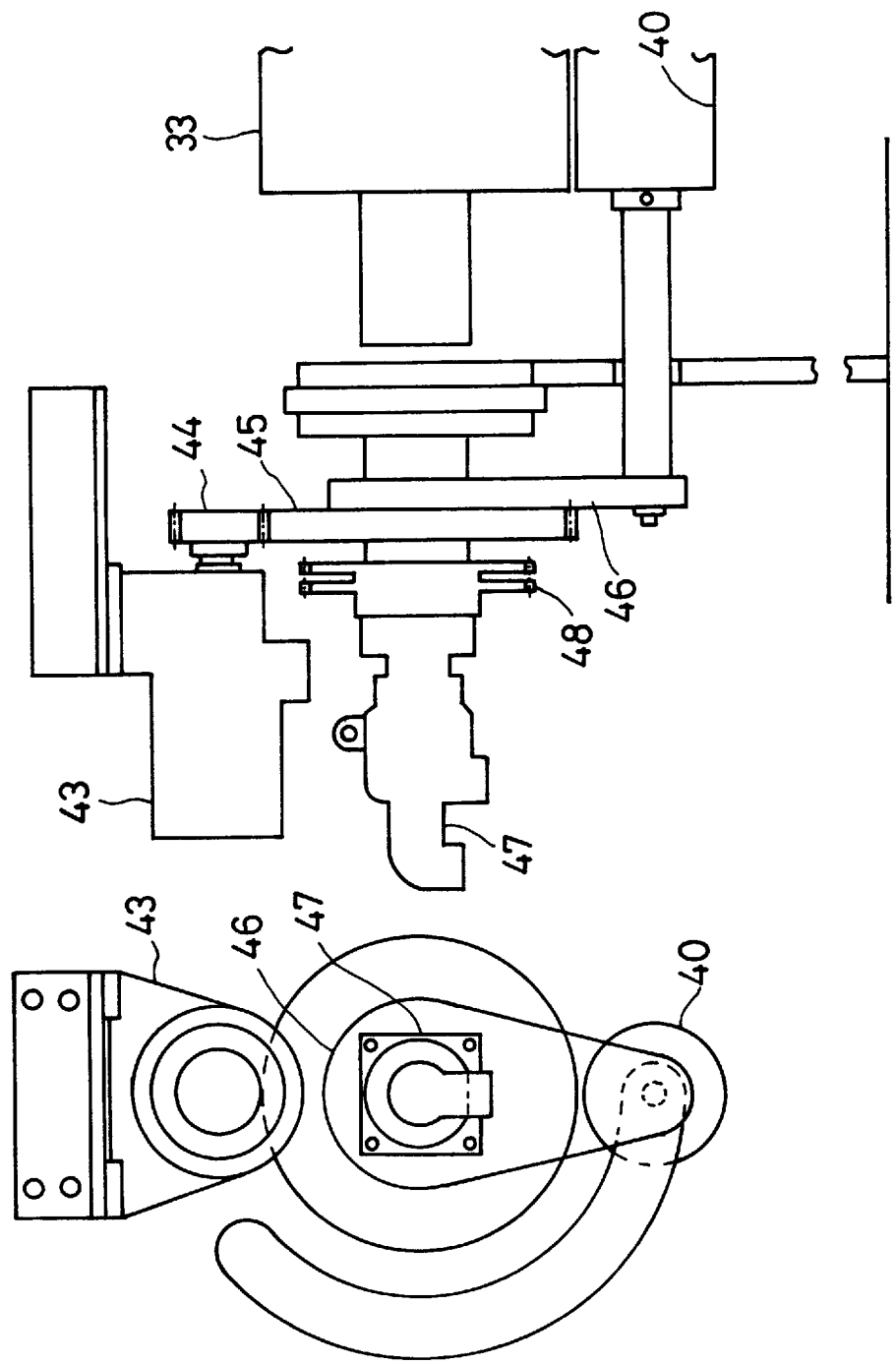

FIG.10A
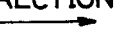
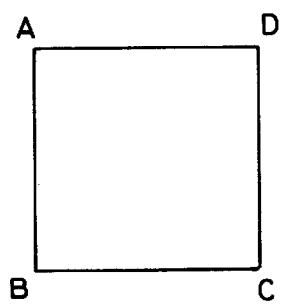
FIG.10B
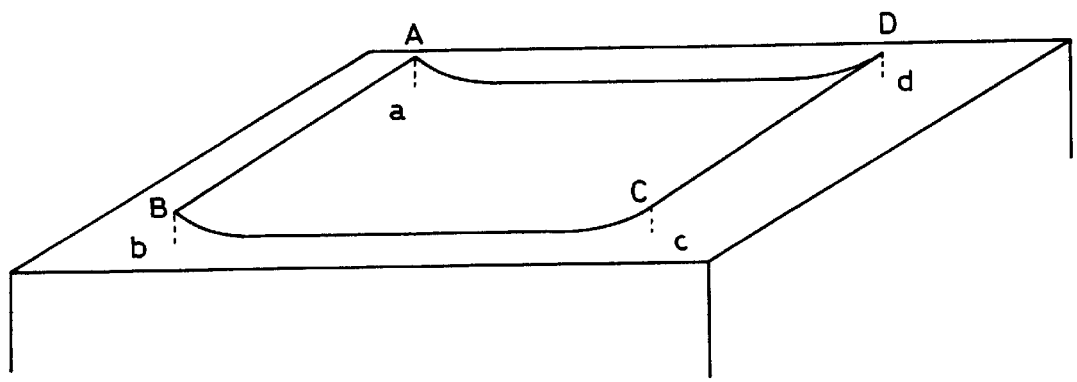

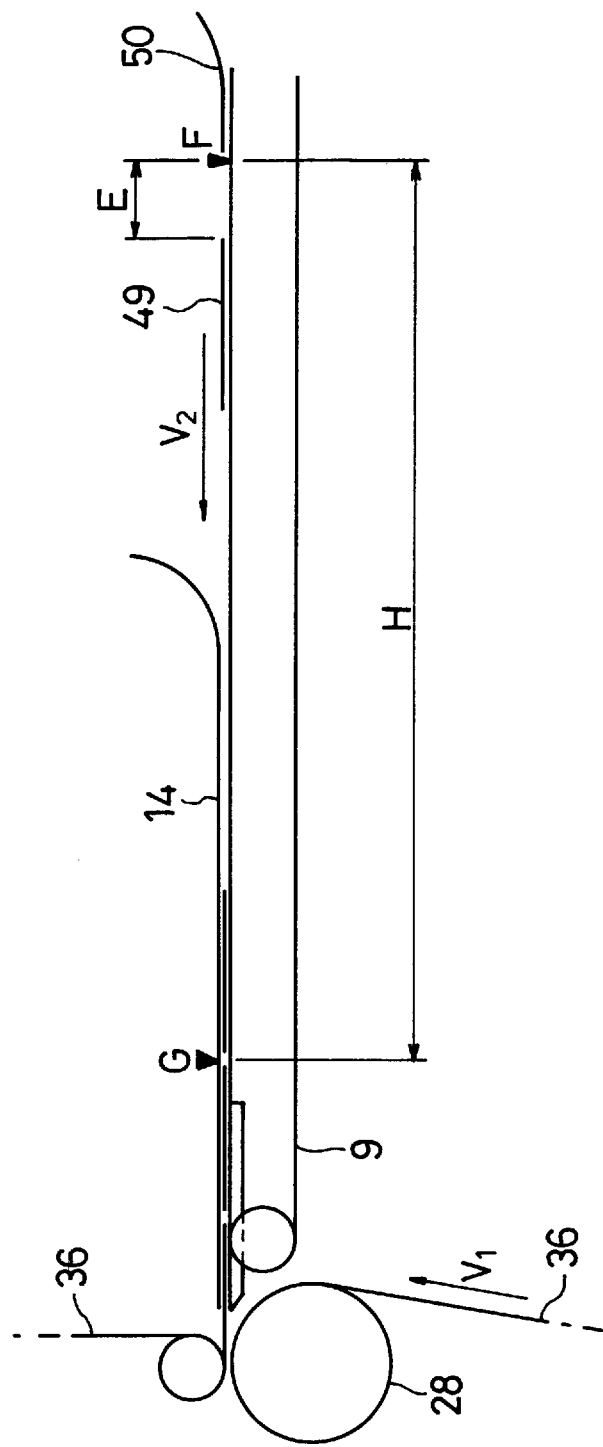

PREPARATION OF LAMINATED SHEETS

BACKGROUND OF THE INVENTION a) Field of the Invention

This invention relates to a process and apparatus for continuously preparing a fiber-reinforced laminated sheet by laminating fiber-reinforced resin sheets resulting from impregnating a sheet of continuous reinforcing fibers such as glass fibers or carbon fibers with a thermoplastic resin such as a polypropylene resin.

b) Description of the Related Art

Fiber-reinforced resin sheets known as unidirectional prepregs are each obtained by forming reinforcing fibers such as glass fibers or carbon fibers into a sheet with the fibers oriented in one direction, impregnating the oriented fiber sheet with a thermosetting resin such as an epoxy resin or an unsaturated polyester resin and precuring the thermosetting resin. Such unidirectional prepregs are used to obtain a desired product by superposing them one over another into a laminated preform with the directions of their fibers changed depending on the shape and performance requirements of the desired product, loading the laminated preform on a forming machine and then forming it into the desired product.

Recently, fiber-reinforced resin sheets making use of a thermoplastic resin such as a polypropylene resin instead of a thermosetting resin such as an epoxy resin or an unsaturated polyester resin have been increasingly developed as those capable of overcoming the brittleness of such a thermosetting resin.

Different from unidirectional prepregs of a thermosetting resin, unidirectional prepregs which use a thermoplastic resin such as a polypropylene resin as described above have been pointed out to develop problems during lamination work as will be described next.

Described specifically, due to lack of tackiness, it is indispensable work to melt and bond resins of stacked individual layers together by using a tool such as an electric soldering iron. Further, a fiber-reinforced sheet is apt to tear in the direction of its fibers when pulled or bent in a direction perpendicular to the orientation of the fibers or caused to extend along a curved surface. Ultimate care is therefore required during lamination work.

Unidirectional prepregs making use of a thermoplastic resin are used as many as needed in a laminated form with the directions of orientation of their fibers changed to predetermined angles. Since lamination work at designated angles must be performed manually, it takes a long time and moreover, tends to make an error in the angle of lamination. It is a further problem of unidirectional prepregs that they have poor handling characteristics because they tend to tear in the direction of fibers.

It is therefore known that the above-described problem can be overcome by superposing two or more unidirectional prepregs with their fiber directions changed from each other and then subjecting them to total welding to form a laminated sheet.

As a process for the continuous preparation of such a laminated sheet, it is conducted to wind unidirectional prepregs in plural layers around a base material while changing their directions as needed. It is however very difficult to continuously wind a unidirectional prepreg around a sheet-like prepreg base material and then to subject them to total welding to form them into a sheet. Further, this process unavoidably results in a laminated sheet constructed of at least three layers.

OBJECT AND SUMMARY OF THE INVENTION

In view of the problems associated with "unidirectional prepregs" according to the conventional processes that their lamination requires many steps, skillful workers and their handling characteristics are poor, an object of the present invention is to overcome these problems by providing a process and apparatus for continuously preparing at a high speed a continuous laminated sheet, which does not contain joints of cut sheets and is physically uniform, without any substantial disturbance to the orientation of fibers by laminating a continuous sheet of a fiber-reinforced thermoplastic resin sheet, which has been reinforced with unidirectionally-oriented fibers, with cut sheets while bringing end faces of the cut sheets into abutment against each other at desired fiber orientation angles and then subjecting the thus-laminated continuous sheet and cut sheets to melt welding and integration.

To achieve the above-described object, the present inventors have proceeded with an extensive investigation. As a result, it has been found that the above object can be attained if mutually-adjacent end faces of cut sheets of a fiber-reinforced thermoplastic resin sheet are brought into abutment against each other. When a wider laminated sheet is required, in addition to the above-mentioned abutment work, two or more fiber-reinforced thermoplastic resin sheets are employed as continuous sheets in combination with the cut sheets, and mutually-adjacent side faces of the continuous sheets are brought into abutment against each other. Each method leads to the completion of a process and apparatus according to the present invention for the continuous preparation of a laminated sheet.

In one aspect of the present invention, there is accordingly provided a preparation process of a laminated sheet, comprising:

successively cutting a fiber-reinforced thermoplastic resin sheet into predetermined dimensions, said resin sheet having been obtained by forming continuous fibers into a sheet with its fibers oriented in one direction and then impregnating the oriented fiber sheet with a thermoplastic resin, whereby a plurality of cut sheets are obtained;

successively feeding the cut sheets into a butting apparatus and bringing adjacent end faces of the cut sheets into abutment against each other without any space therebetween while aligning corresponding cut end faces of the cut sheets together, whereby a butted cut sheet group is obtained;

feeding the cut sheet group and a continuous sheet, which is another fiber-reinforced thermoplastic resin sheet and is caused to run in a superposed relationship with the cut sheet group, into a laminating section and causing the cut sheet group and the continuous sheet to cling to a heating roller, whereby the cut sheet group and the continuous sheet are subjected to melt welding;

supporting and joining under pressure the melt-welded cut sheet group and continuous sheet between nip rollers;

causing the joined cut sheet group and continuous sheet to cling to a cooling roller to cool and harden the joined cut sheet group and continuous sheet, whereby the joined cut sheet group and continuous sheet are subjected to total welding to continuously prepare a laminated sheet.

In another aspect of the present invention, there is also provided a preparation process similar to the preparation process according to the first aspect of the present invention except that plural continuous sheets which are fiber-reinforced thermoplastic resin sheets and have been caused to run side by side in a relationship superposed with the cut sheet group can be fed instead of the single continuous sheet into a laminating section.

In preferred embodiments of the preparation processes according to the present invention, (1) the cut sheets and the continuous sheet(s) are continuously stacked together with directions of fiber orientations thereof being shifted from each other over a desired angle in a range of from 45 degrees to 135 degrees; (2) the fiber-reinforced thermoplastic resin sheet(s) have a thickness not smaller than 30 μm but not greater than 500 μm and have a reinforcing fiber content not lower than 30% but not higher than 85% by volume; (3) the reinforcing fibers are glass fibers or carbon fibers, and the thermoplastic resin is a polypropylene, polystyrene or polyethylene resin; (4) through a space between a belt conveyor, which is arranged right before said laminating section and is driven at a speed higher than a laminating speed, and a lifting prevention sheet disposed above said belt conveyor, the cut sheets are caused to pass with a difference in speed between each preceding cut sheet and its trailing cut sheet to bring the front end face of the trailing cut sheet into abutment against the rear end face of the preceding cut sheet, whereby the cut sheets are continuously fed into said laminating section; (5) the adjacent side faces of the respective continuous sheets running side by side are individually detected; let-off shafts for the individual continuous sheets are moved in parallel with each other to make the side faces of the continuous sheets in each adjacent set register with a reference lines set as desired, thereby bringing the side faces of the continuous sheets in each adjacent set into abutment against each other; and the continuous sheets are then continuously fed into said laminating section with one of said let-off shafts being held at a fixed position and with the side face of the continuous sheet corresponding to the other let-off shaft being maintained in a butted relationship with the adjacent side face of the continuous sheet corresponding to said one let-off shaft; (6) upon insertion of two fiber-reinforced thermoplastic resin sheets from an upper side and a lower side, respectively, by endless belts, the two fiber-reinforced thermoplastic resin sheets are caused to pass through a butting section where any discrepancy of each preceding cut sheet can be absorbed; the two fiber-reinforced thermoplastic resin sheets so fed are caused to cling to a heating roller together with said endless belts so that the fiber-reinforced thermoplastic resin sheets are subjected to melt welding and joining under pressure via said endless belts; the two fiber-reinforced thermoplastic resin sheets are caused to cling to a cooling roller together with said endless belts while being maintained in the thus-joined state, thereby cooling and hardening the fiber-reinforced thermoplastic resin sheets; and a laminated sheet of the thus-welded fiber-reinforced thermoplastic resin sheets is then peeled off from said endless belts; (7) upon cooling the melt-welded, fiber-reinforced thermoplastic resin sheets subjected, a position of a correcting roller is moved along said cooling roller via the fiber-reinforced thermoplastic resin sheets held between said endless belts, whereby an amount of contact arc of the fiber-reinforced thermoplastic resin sheets with said cooling roller is changed to adjust an amount of warp of the laminated sheet; (8) the position of said correcting roller is moved along said cooling roller by converting rotation of an electric motor into rotation of said correcting roller via gears; and (9) a device for feeding continuous webs from an upper side and a lower side, respectively, is arranged before said laminating section to feed into said laminating section the cut sheets, the continuous sheet(s) and the web(s) in a lamination structure selected from (upper web/cut sheets/continuous sheet), (upper web/cut sheets/continuous sheet/lower web) or (cut sheets/continuous sheet/lower web), whereby a laminated sheet is continuously prepared.

In a further aspect of the present invention, there is also provided a continuous preparation apparatus for a laminated sheet, comprising:

a cut-sheet let-off device for successively cutting a fiber-reinforced thermoplastic resin sheet into predetermined dimensions, said resin sheet having been obtained by forming continuous fibers into a sheet with the fibers oriented in one direction and then impregnating the oriented fiber sheet with a thermoplastic resin, and feeding out a plurality of cut sheets so obtained;

a butting device for successively feeding the cut sheets and bringing adjacent end faces of the cut sheets into abutment against each other without any space therebetween while aligning corresponding cut end faces of the cut sheets together;

a let-off device for feeding a continuous sheet as another fiber-reinforced thermoplastic resin sheet to be run in a superposed relationship with the cut sheets or a let-off device for feeding continuous sheets as a plurality of fiber-reinforced thermoplastic resin sheets, which are to be run in a superposed relationship with the cut sheets, while bringing adjacent side faces of the continuous sheets into abutment against each other; and a laminating device for causing the cut sheets and the continuous sheet to cling to a heating roller to subject the cut sheets and the continuous sheet to melt welding, supporting and joining under pressure the melt-welded cut sheets and continuous sheet between nip rollers, and causing the joined cut sheet group and continuous sheet to cling to a cooling roller to cool and harden the joined cut sheet group and continuous sheet.

In preferred embodiments of the preparation apparatus according to the present invention, (1) said cut-sheet let-off device comprises a dancer roller for feeding the fiber-reinforced thermoplastic resin sheet as a continuous sheet by a predetermined length; a cutting device for successively cutting the continuous sheet fed by a predetermined length, whereby the cut sheets are obtained; an optional distributing conveyor for distributing the cut sheets onto an upper and lower tables of a two-stage table; a positioning roller for feeding out each of the cut sheets to a predetermined position on the two-stage table; and a let-off roller for changing an advancing direction of each of the thus-positioned cut sheets over a desired angle of from 45 to 135 degrees and feeding the cut sheet onto a belt conveyor; (2) said butting device brings the respective cut sheets into abutment against each other at the adjacent end faces thereof by a difference in feeding speed between each preceding cut sheet and the trailing cut sheet thereof, and comprises: feeding guide rollers for nipping each preceding cut sheet fed by a belt conveyor to reduce the feeding speed of the preceding cut sheet, whereby a rear end face of the preceding cut sheet and a front end face of the trailing cut sheet are brought into abutment against each other; a lifting prevention sheet arranged above said feeding guide rollers, whereby the cut sheets are held down onto said belt conveyor by said lifting prevention sheet's own weight to improve the accuracy of abutment between the cut sheets; and positioning devices arranged on opposite sides of said belt conveyor at positions corresponding to a rear end portion and side portions of said lifting prevention sheet, respectively, so that each preceding cut sheet and the trailing cut sheet thereof are precisely positioned relative to a lateral direction; (3) said butting device comprises a first and second end face detectors arranged between a first continuous sheet and a guide roller therefor and between a second continuous sheet and a guide roller therefor, respectively, to detect positions of adjacent side faces of the first and second continuous sheets; means for sliding let-off reels of a first and second rolled sheets corresponding to the first and second continuous sheets, respectively, so that the adjacent side faces of the first and second continuous sheets are brought close to a desired reference line; and a cross direction guide for moving the first continuous sheet toward the second continuous sheet so that the first and second continuous sheets are fed out into said laminating device with a distance between the adjacent side faces of the first and second continuous sheets being controlled in a range of from 0 mm to 1 mm; (4) said laminating device comprises a plurality of heating rollers and cooling rollers, an upper and lower endless belts, an upper and lower dancer rollers, and a correcting roller, said upper and lower dancer rollers controlling said upper and lower endless belts' tensions; and cut sheets, a first and second continuous sheets and an upper and lower webs, which have been fed into said laminating device, are held as an assembly between said upper and lower endless belts, the assembly is caused to cling together with said endless belts to said heating rollers to successively heat the assembly through an upper and lower surfaces thereof, the assembly is then caused to cling to said cooling rollers in a similar manner as in the heating of the assembly to successively cool the assembly through said upper and lower surfaces thereof, and said correcting roller is arranged movably along a circumferential wall of one of said cooling rollers, said cooling roller being located in a temperature range where the resin is solidified to set configurations of the assembly, whereby any upward or downward warp of the resulting laminated sheet is corrected.

According to the processes and apparatus of the present invention for the preparation of the laminated sheet, mutually-adjacent end faces of cut sheets are brought into abutment against each other and, where two or more continuous sheets are employed, mutually-adjacent side faces of the continuous sheets are also brought into abutment against each other, and the cut sheets and the continuous sheet(s) are fed into the laminating section and are subjected to melt welding, followed by cooling and solidification. It is therefore possible to prepare a laminated sheet which does not contain any joints between the sheets and is physically uniform. Further, cut sheets can be laminated with their fiber directions varied as desired by changing the advancing directions of the cut sheets over desired angles of from 45 to 135 degrees with a let-off roller and then feeding them out onto the conveyor. Further, the correcting roller can be moved along the circumferential wall of the associated cooling roller to adjust an amount of contact arc of the fiber-reinforced thermoplastic resin sheets with said cooling roller. Without the need for an adjustment of the temperature of the cooling roller, this makes it possible to promptly cope with changes in the amount of warp correction, thereby facilitating feed-back control of warping and permitting stable production.

BRIEF DESCRIPTION OF THE DRAWINGS

FIGS. 3A and 3B are simplified front views of a distributing section for cut sheets in the preparation apparatus of FIG. 1;

FIG. 4 is an illustrative time chart of operations by various members in the distributing section upon distribution of cut sheets;

FIG. 9A is a fragmentary right side view of a cooling roller and a correcting roller in the preparation apparatus of FIG. 1, and FIG. 9B is a front view of the cooling roller and the correcting roller;

FIGS. 10A and 10B illustrate a relationship between cutting-out of a sample and a warp;

FIG. 11 is a simplified fragmentary front view of a belt conveyor and is useful in determining a relationship between a laminating speed and a drive speed of the belt conveyor;

DETAILED DESCRIPTION OF THE INVENTION

Figure 1:
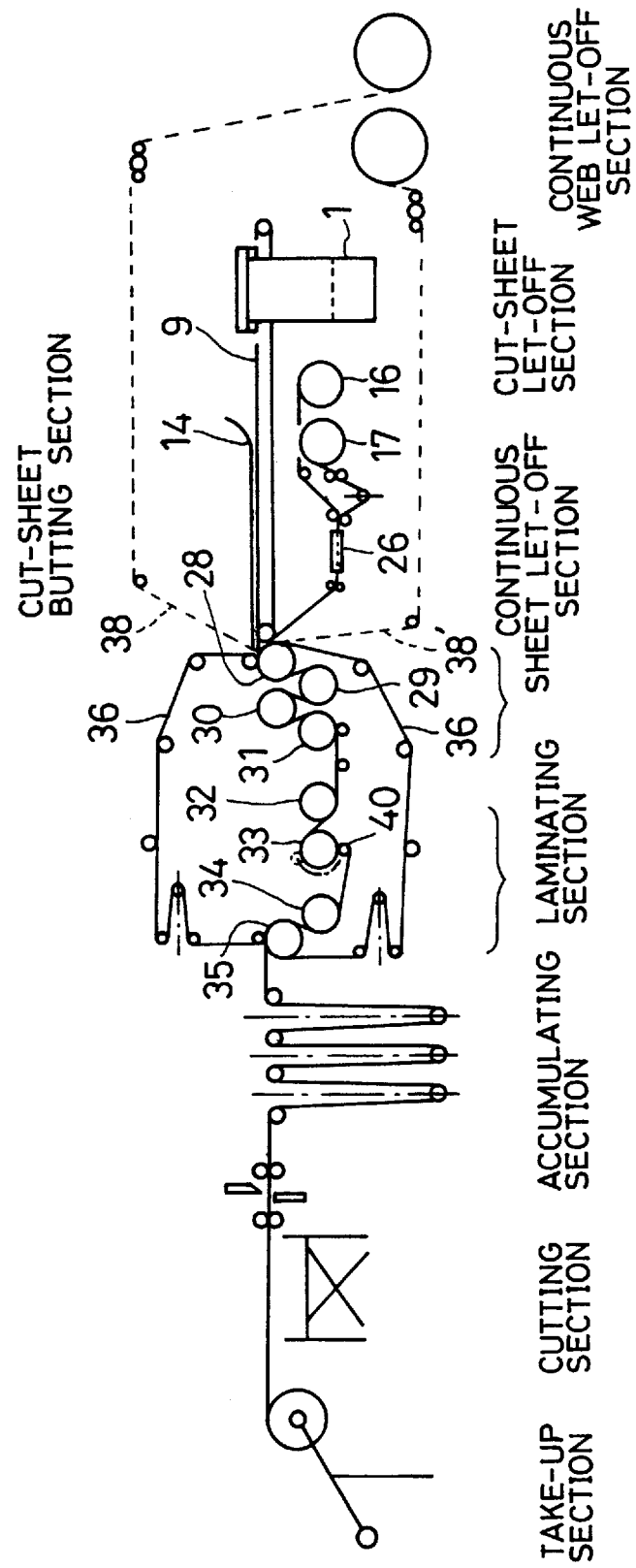
FIG. 1 is a simplified overall front view of an apparatus according to one embodiment of the present invention, which is suitable for use in the continuous preparation of a laminated sheet according to the present invention.

The present invention has its basis on a technical conception as described next. Namely, in lamination work of unidirectional prepregs, it has heretofore been the practice in most cases to superpose a prepreg on another prepreg with the direction of the former prepreg being changed relative to the direction of the latter prepreg so that continuous fibers in the former prepreg are directed at an angle of from 45 to 135 degrees relative to the direction of continuous fibers in the latter prepreg which is supposed to be 0 degree as a reference. Accordingly, if two prepregs are stacked in combination with the directions of fibers thereof set at 0 degree and 45–135 degrees, respectively, and then subjected to total welding and two-layer laminates are provided beforehand as many as needed in this manner, lamination can be achieved by simply stacking these two-layer laminates one over another, so that the above-described lamination work can be rationalized.

Different from manual lamination of prepregs one by one as in the conventional lamination work, the above conception has made it possible to reduce influence on physical properties of a product, which is caused by slight deviations in the laminating angle. Further, in the laminated sheet prepared by integration of two-layer laminates formed in advance by total welding as described above, the individual layers are restrained with respect to each other so that the laminated sheet has enhanced strength in a direction perpendicular to the fibers compared with a laminated sheet prepared by stacking single-layer prepregs together. It has therefore become possible to eliminate the above-described problem of conventional laminated sheets that they tend to tear in the direction of fibers and at the same time, to bring about improved handling characteristics.

The fiber-reinforced thermoplastic resin sheet laminate according to the present invention is basically adopted in the form of a sheet-shaped material obtained by superposing cut sheets, which have been formed from a fiber-reinforced thermoplastic resin sheet, on a continuous sheet. As the fiber-reinforced thermoplastic resin sheet for the formation of the cut sheets and the lower continuous sheet, it is fundamentally possible, without limitation, to use fiber-reinforced thermoplastic resin sheets produced by the same process.

Illustrative thermoplastic resins usable in the fiber-reinforced thermoplastic resin sheet laminate according to the present invention include, but are not limited to, polystyrene, polyvinyl chloride, high-density polyethylene, polypropylene, polyamides, polycarbonates, polybutylene terephthalate, polystyrene terephthalate, polyethersulfones, polysulfones, polyetherimides, polyetheretherketones, and polyphenylene sulfides.

Illustrative fiber materials usable in the fiber-reinforced thermoplastic resin sheet laminate according to the present invention include, but are not limited to, glass fibers, carbon fibers, synthetic resin fibers such as aramid fibers [for example, KEVLAR (trademark), product of E.I. du Pont de Nemours & Co. Inc.], inorganic fibers such as silicon carbide fibers, and metal fibers such as titanium fibers, boron fibers and stainless fibers.

No particular limitation is imposed on the form of a web which is formed using the above-described fiber material but, for example, a web in the form of a non-woven fabric, especially a web in the form of a cloth of glass fibers or the like is generally usable.

As techniques for the preparation of fiber-reinforced thermoplastic resin sheets, there are a variety of processes which have both merits and demerits. It is therefore necessary to use fiber-reinforced thermoplastic resin sheets produced by the process adequately chosen depending on the properties required for an intended application field.

For example, fiber-reinforced thermoplastic resin sheets produced by the tortuous belt method have merits such as good fiber orientation, low resin deterioration, formability with reduced thickness and producibility of high-fiber ($W_f$: 60–80%) products, but are not suited for the production of thick-wall products. However, application of the process according to the present invention makes it possible not only to eliminate the demerit that thick-wall products cannot be produced but also to provide a laminated sheet having excellent physical properties.

The fiber-reinforced thermoplastic resin sheets employed in the present invention are continuous sheets and those having a width of from 50 mm to 2,000 mm can be used, although fiber-reinforced thermoplastic resin sheets usable in the present invention are not necessarily limited thereto. Their width can preferably be from 200 mm to 1,200 mm, with 500 mm to 1,000 mm being more preferred.

A process and apparatus according to the present invention for the continuous preparation of a laminated sheet of fiber-reinforced thermoplastic resin sheets will next be described with reference to the accompanying drawings.

Referring first to FIG. 1, at a cut-sheet let-off section, a fiber-reinforced thermoplastic resin sheet is successively cut at a predetermined length into cut sheets, and the cut sheets are then fed out with the direction of its fibers changed in a desired direction of from 45 to 135 degrees as measured assuming that the angle of a machine direction (hereinafter abbreviated as the "MD") is 0 degree. Through a cut-sheet butting section, the sheets are brought into abutment against each other. The thus-abutted cut sheets are then superposed with continuous sheets fed from a continuous sheet let-off section and having fibers oriented in a direction parallel to the MD and optionally with continuous webs fed from an upper and lower continuous web let-off sections, respectively, and are then guided into a laminating section. For simplification, reference to the optional webs may be omitted in the subsequent description. The laminating section comprises a heating section and a cooling section, where the cut sheets and the continuous sheets are joined together under heat and pressure and are then hardened into an integral structure by cooling. Subsequent to accumulation at an accumulating section, the thus-formed laminated sheet product is cut into predetermined dimensions and is taken up as is. The above preparation will hereinafter be described step by step in detail.

Cut-sheet let-off section

Figure 2:
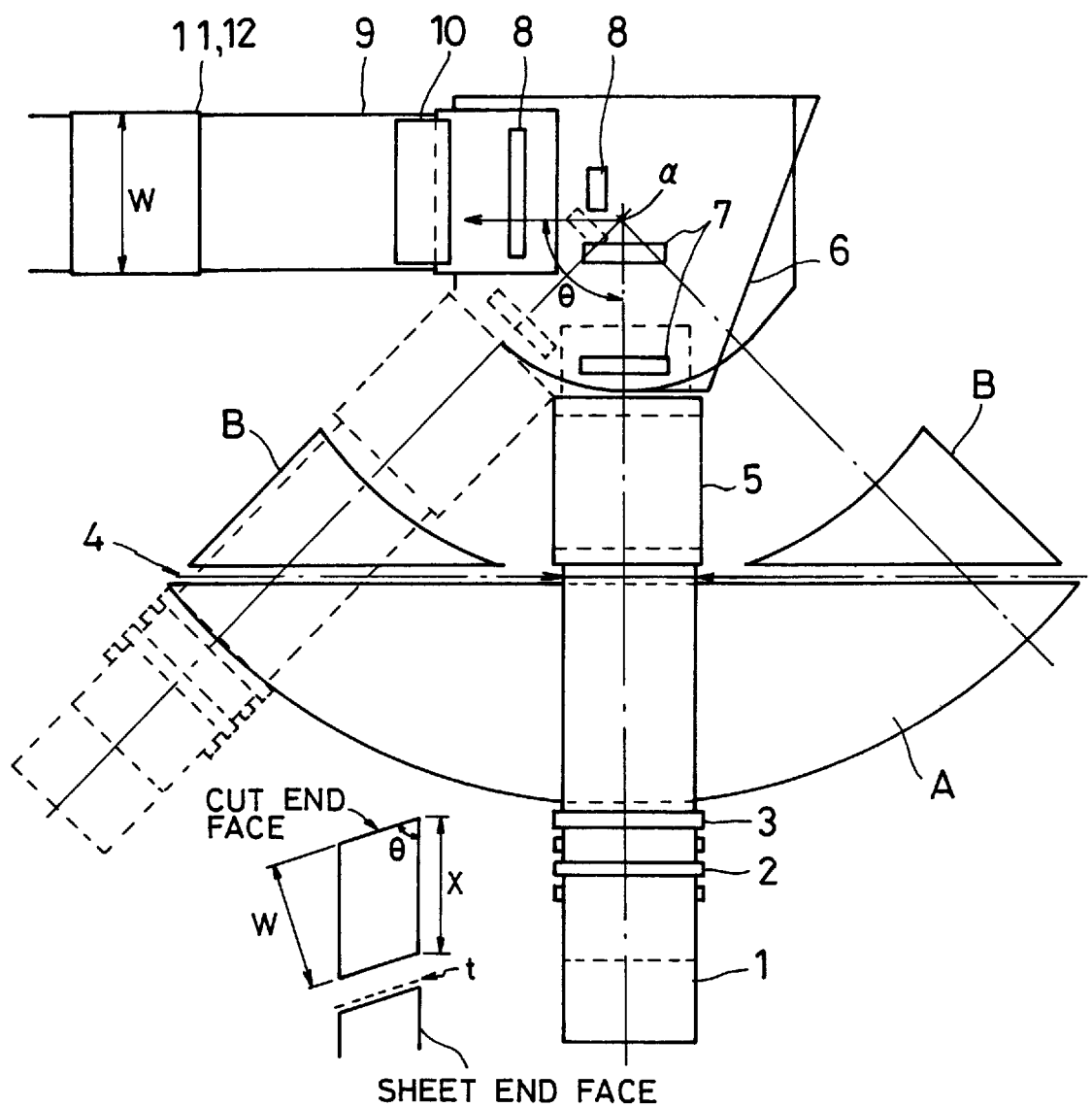
FIG. 2 is a plan view of a let-off section for cut sheets in the preparation apparatus of FIG. 1.

In FIGS. 2, 3A and 3B, a wound sheet 1 for cut sheets, said wound sheet being a fiber-reinforced thermoplastic resin sheet, is fed over a predetermined length, for example, 1,300 mm by feed rollers 3 via a dancer roller 2. The feed rollers 3 are then stopped and the fiber-reinforced thermoplastic resin sheet 1 is cut at the predetermined length at a cutting section 4. The length of each cut sheet so obtained is basically set at the same length as the total width of a group of continuous sheets which are fed from a lower side and may hereinafter be called the "combined continuous sheets". During this cutting operation, the fiber-reinforced thermoplastic resin sheet 1 is paid out at a constant speed and a length of the fiber-reinforced thermoplastic resin sheet 1 paid out during a suspension of its feeding for the cutting is taken up by the dancer roller 2.

If necessary, the cut sheets are distributed alternately one by one onto an upper and lower tables of an upper/lower two-stage table 6 by a distributing conveyor 5 (see FIG. 3A), and are then fed out to predetermined positions on the upper and lower tables by corresponding positioning rollers 7.

Thereafter, the cut sheets are changed in advancing direction to a desired angle of from 45 to 135 degrees by corresponding let-off rollers 8 (see FIG. 2), and are fed out onto a belt conveyor 9. In front of the let-off rollers 8, guide plates 10 are arranged to smoothen the feeding-out of the cut sheets as shown in FIG. 3B.

Incidentally, the elements indicated at numerals 1–3, 5 and 7 are horizontally turnable about a point α as a center over a range of from 45 to 135 degrees with respect to the continuous sheets, and the cutting section 4 is slidable following each turning movement of the above elements. This has made it possible to feed out the cut sheets onto the belt conveyor in such a way that cut end faces of the cut sheets are brought into registration with their corresponding side faces of the continuous sheets and the cut sheets are each directed with the direction of its fibers oriented at an angle θ (45 degrees<θ<135 degrees) with respect to the orientation of continuous fibers in the continuous sheets.

Further, the cutting length X of each cut sheet can be determined in accordance with the following formula:

$$X = W/\sin\theta$$

where

θ: laminating angle; and

W: total width of the combined continuous sheets.

Operations at the respective sections are shown by way of example in the time chart of FIG. 4. In the time chart, the rollers, that is, the positioning roller 7 and the let-off roller 8 both indicate operations on the upper table and operations by the corresponding rollers on the lower table take place 1 cycle behind the corresponding operations on the upper table.

Cut-sheet butting section

Figure 5A:
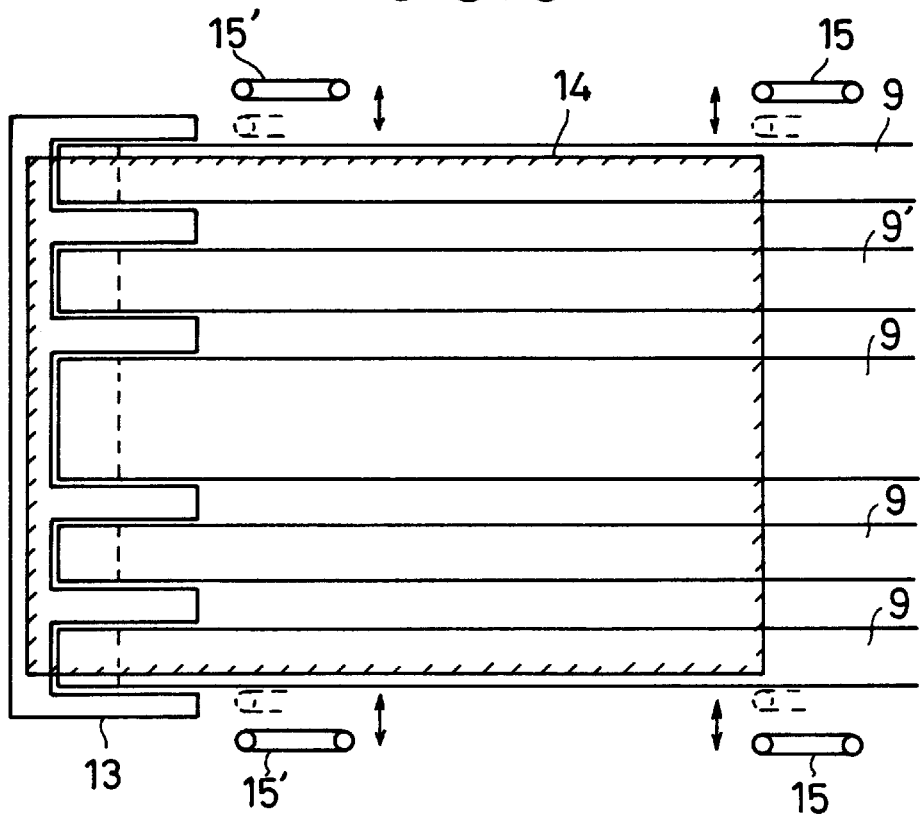
FIG. 5A is a simplified plan view of a butting section for cut sheets in the preparation apparatus of FIG. 1.
Figure 5B:
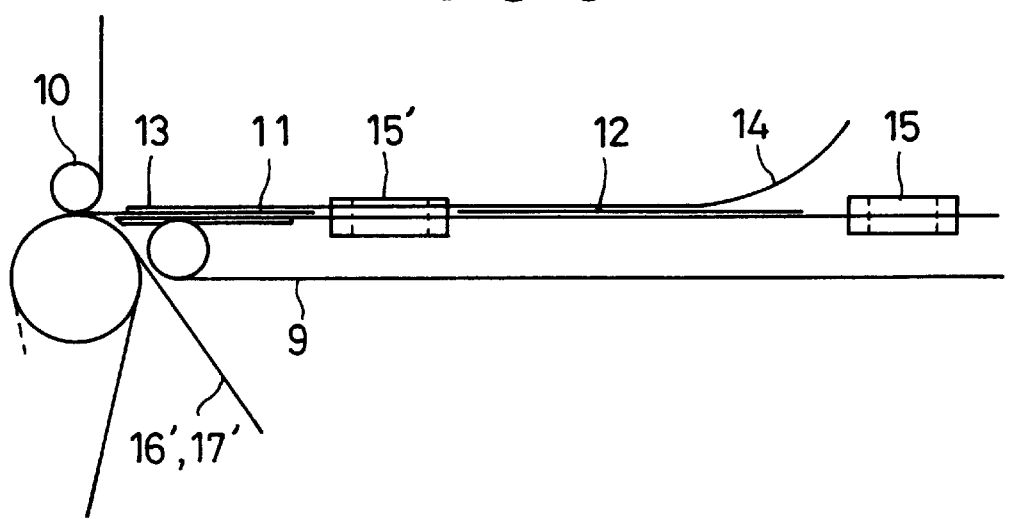
FIG. 5B is a simplified front view of the butting section.

It is difficult to form cut sheets from a continuous sheet and then to continuously bring their end faces into abutment at an accuracy of from 0 to 1 mm rather than their cut end faces and at the same time to feed the cut sheets. It is therefore necessary to arrange a cut-sheet abutting section shown by way of example in FIGS. 5A and 5B.

Each preceding cut sheet 11 and its trailing cut sheet 12 can be brought into abutment against each other at their proximal end faces by setting a difference in feeding speed between the respective cut sheets.

From the cut-sheet let-off section to the laminating section, each cut sheet is fed by the belt conveyor 9. Here, the following inequality is established:

$$V_1 < V_2$$

where $V_1$: laminating speed, in other words, forming speed; and $V_2$: drive speed of the belt conveyor 9.

The preceding cut sheet 11 is fed out at $V_2$ by the belt conveyor 9 from the cut-sheet let-off section. As soon as the preceding cut sheet 11 is nipped between a feed guide roller to the laminating section and a heating roller 28, the feeding speed of the preceding cut sheet 11 drops from $V_2$ to $V_1$ and at the same time, sliding begins to take place between the preceding cut sheet 11 and the belt conveyor 9.

Now, the trailing cut sheet 12 whose feeding has been delayed due to the cutting and the change in advancing direction reaches the preceding cut sheet 11 so that the mutually adjacent end faces thereof are brought into abutment without any space therebetween.

The resulting cut sheet group, in which the individual cut sheets are maintained in abutment against each other at the mutually-adjacent end faces thereof, is transferred from the belt conveyor 9 onto a bridge plate 13 and is then fed into the laminating section. At this time, the cut sheets 11, 12 are considered to be delayed compared with the continuous sheets 16', 17' because of a difference in circumferential speed between their corresponding feed rollers. According to this butting method, a discrepancy corresponding to the delay of the cut sheets can be absorbed by sliding between the cut sheets 11, 12 and the belt conveyor 9.

Here, it is necessary to prevent any substantial upward displacement of each cut sheet to avoid possible overlapping between the front end of the trailing cut sheet 12 and the rear end of the preceding cut sheet 11 and/or possible bending of the rear end of the trailing cut sheet 12.

As a construction for effecting the above prevention, description will first be made of one relying upon the thickness of each cut sheet for the achievement of the prevention. Namely, the cut sheets are brought into abutment against each other by making them pass through a space x which satisfies the following inequality:

$$t < x < 2t$$

where x: space for passing each cut sheet; and t: thickness of each cut sheet.

It is however difficult to adjust the space x when the thickness t of each cut sheet is small. In some instances, it may become impossible to stably perform the abutting operation at high speed.

It is therefore preferred to adopt for this section a construction which makes use of a lifting prevention sheet 14.

This lifting prevention sheet 14 is arranged above the belt conveyor 9 and serves to hold down the cut sheets onto belt conveyor 9 under even pressure.

Illustrative examples of the lifting prevention sheet 14 include a construction in the form of a plate having both rigidity and elasticity so that the cut sheets 11, 12 are held down onto the belt conveyor 9 and a construction in the form of a suspended sheet or the like so that the cut sheets 11, 12 are held down onto the belt conveyor 9 by the own weight of the sheet. Examples of the material of the plate include, but are not limited to, metals such as stainless steel and aluminum and resins. On the other hand, examples of the material of the sheet include, but are not limited to, polyvinyl chloride and TEFLON (trademark, product of E.I. du Pont de Nemours & Co. Inc.).

The holding pressure for the cut sheets 11, 12 by the lifting prevention sheet 14 varies depending on the thickness of the cut sheets, the kinds of the matrix resin and fibers of the cut sheets, the material of the lifting prevention sheet 14, the difference in feeding speed between each preceding cut sheet and its trailing cut sheet, and the like. A holding pressure in a range of from 0.1 to 5.0 $g/cm^2$ is however desired when the matrix resin is polypropylene, the content of glass fibers as reinforcing fibers is 70% by volume, the thickness of each cut sheet is 0.2 mm, and the difference in feeding speed between each preceding cut sheet and its trailing cut sheet ranges from 5 to 50 m/min.

The above-described lifting prevention sheet 14 holds down the upper surfaces of the cut sheets to prevent possible overlapping between the front end of the trailing cut sheet 12 and the rear end of the preceding cut sheet 11 and/or possible bending of the front end of the trailing cut sheet 12.

Positioning devices 15, 15' are arranged on opposite sides of the belt conveyor 9 at positions corresponding to a rear end portion and side portions of the lifting prevention sheet 14, respectively, so that the sheets 11, 12 are precisely positioned relative to a lateral direction. Each cut sheet is therefore moved toward a central axis of the belt conveyor so that the cut sheet is positioned symmetrically relative to the central axis. It is therefore possible to align the cut sheets 11, 12 along the above-described central axis and then to feed them into the laminating section.

These positioning devices 15, 15' serve to fix the cut end faces of the cut sheets to prevent the cut sheets from moving sidewards upon abutment when the laminating angle satisfies the following inequality:

$$135 \geq \theta > 90 \text{ or } 90 > \theta \geq 45$$

or to prevent the cut sheets from being inclined with respect to the central axis of the belt conveyor upon abutment when the abutting end faces of the cut sheets are curved.

By bringing such discrete cut sheets into abutment while aligning the directions of fibers of the individual cut sheets in parallel with each other, the cut sheets can be formed into a continuous sheet. It is therefore possible to prepare a continuous laminated sheet which does not contain any joints between the individual cut sheets and is physically uniform.

Figure 6A:
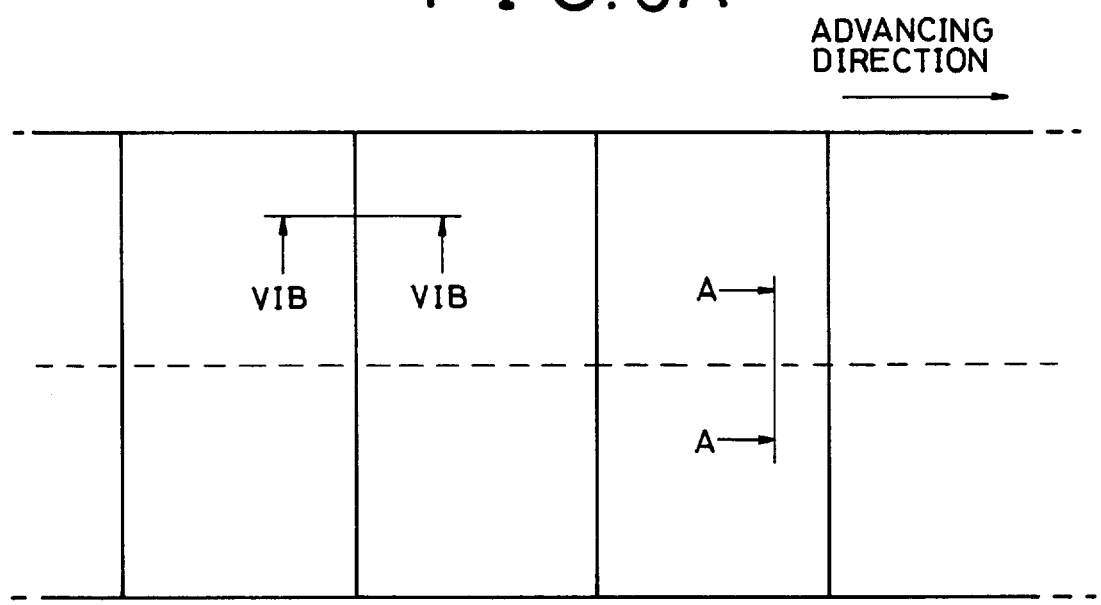
FIG. 6A is a simplified plan view of a plurality of cut sheets joined together.
Figure 6B:
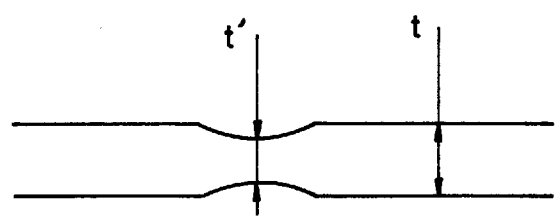
FIG. 6B is an enlarged fragmentary cross-sectional view taken in the direction of arrows X—X and VIB—VIB of FIG. 6A and illustrates a joined portion between two cut sheets.

According to the above-described abutting method, the joint portions between the individual cut sheets are in a jointless form and physically remain uniform. A description is now made of the jointless form of each joint portion between the adjacent two of the cut sheets. FIG. 6B is a cross-sectional view of a vertical cut face of a joint portion as viewed in the direction of arrows VIB—VIB of FIG. 6A. Assume that the thickness of the sheet is t and the minimum thickness of the joint portion is t'. A joint portion can be said to be in a jointless form if the ratio t'/t ranges from 0.9 to 1.0. At ratios smaller than 0.9, fibers are not sufficient so that the strength is not sufficient. Ratios greater than 1.0 may however result in appearance of joints when bonded together into a formed body.

Continuous sheet let-off section (sheet-combining device)

Figure 7A:
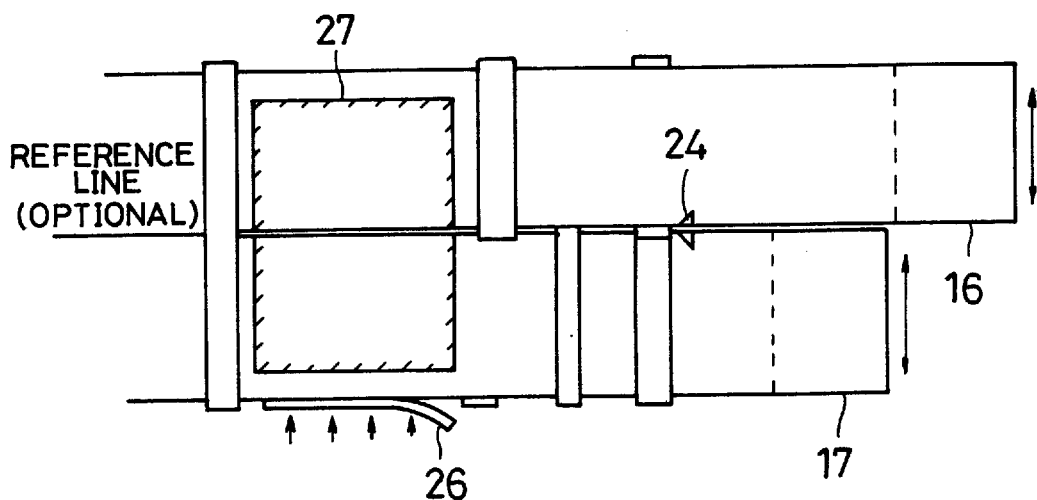
FIG. 7A is a simplified plan view of a let-off section for continuous sheets in the preparation apparatus of FIG. 1.
Figure 7B:
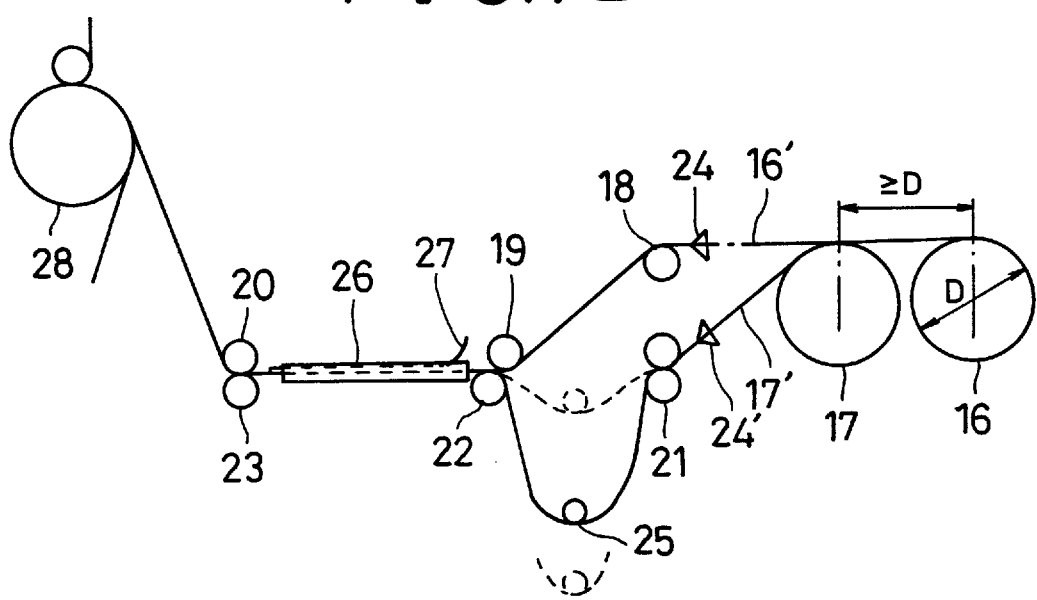
FIG. 7B is a simplified front view of the let-off section for the continuous sheets.

As is illustrated in FIGS. 7A and 7B, wound continuous sheets 16, 17 are arranged with their central axes separated from each other by at least a diameter D of the wound continuous sheets and continuous sheets are paid out side by side. In FIG. 7B, the continuous sheet 16' is fed into the laminating section by way of guide rollers 18 to 20, while the continuous sheet 17' is fed into the laminating section by way of guide rollers 21 to 23. The wound sheets 16, 17 as the continuous sheets preferably have the same length from the standpoint of production efficiency, and the releasing speed $V_4$ of the continuous sheets is always maintained at the same speed as the laminating speed $V_1$.

As is shown in FIG. 7A, let-off reels of the continuous sheets are slidable in the lateral direction. The continuous sheets 16', 17' can be fed out to the guide rollers 19, 22 with their mutually-adjacent side faces separated from each other at an interval of from 0 mm to 1 mm by detecting the mutually-adjacent side faces of the continuous sheets 16', 17' with a side face detector 24 arranged between the wound continuous sheet 16 and the guide roller 18 for the continuous sheet 16' and a side face detector 24' arranged between the wound continuous sheet 17 and the guide roller 21 for the continuous sheet 17'.

As the adjusting method for the positions of the side faces of the continuous sheets 16', 17', the steering roller method or the like is conceivable in addition to the above-described method. It is however to be borne in mind that the adjustment method is not limited to these methods.

The continuous sheet 16' is maintained under a constant tension from the wound sheet 16 to the laminating section. On the other hand, the continuous sheet 17' is maintained under a constant tension from the wound sheet 17 to the laminating section via the guide roller 21, 22, 23. Between the guide roller 21 and the guide roller 23, it is therefore only the weight of a dancer roller 25 that is applied as a tension to the continuous sheet 17'.

The continuous sheet 17' which has been fed past the guide roller 22 is brought close to the continuous sheet 16' by a cross direction guide 26, and mutually-adjacent side faces thereof are brought into abutment against each other.

By bringing the side faces of the continuous sheets into abutment against each other as described above, a joint portion between the continuous sheets is obtained in a jointless form and a continuous laminated sheet can be maintained physically uniform.

A description will now be made of the jointless form of the continuous sheets. In FIG. 6A, a joint portion between the continuous sheets is indicated by arrows X—X. The jointless form in this case can be considered to be similar to the jointless form of the joint portion between each two adjacent cut sheets.

Further, to prevent the side faces of the continuous sheets from overlapping or being bent upon abutment, a lifting prevention sheet 27 for the continuous sheets is arranged as in the cut-sheet butting section.

Although the two wound sheets of continuous sheets are used in FIGS. 7A and 7B, one continuous sheet or three or more continuous sheets can be used.

Laminating section

First, for the melt welding of such sheets, it may be contemplated to melt the matrix resin by non-contact heating, for example, by using a far-infrared heater, a hot air heater or the like.

However, when unidirectional prepregs making use of a thermoplastic resin such as that described above are heated in a non-contact manner, the matrix resin undergoes shrinkage as the matrix resin melts. The sheet-like form is deformed so that the prepregs become no longer usable for lamination.

According to the present invention, the sheets are subjected to contact heating and cooling via the endless belts. This has made it possible not only to overcome the above-described problems but also to avoid sticking of a melted resin on a surface of a heating body. Further, the cooling and hardening with the sheets being held between the endless belts has also made it possible to achieve good release from the endless belts and also to provide the laminated sheet with improved surface qualities without disturbance of the fibers.

Figure 8:
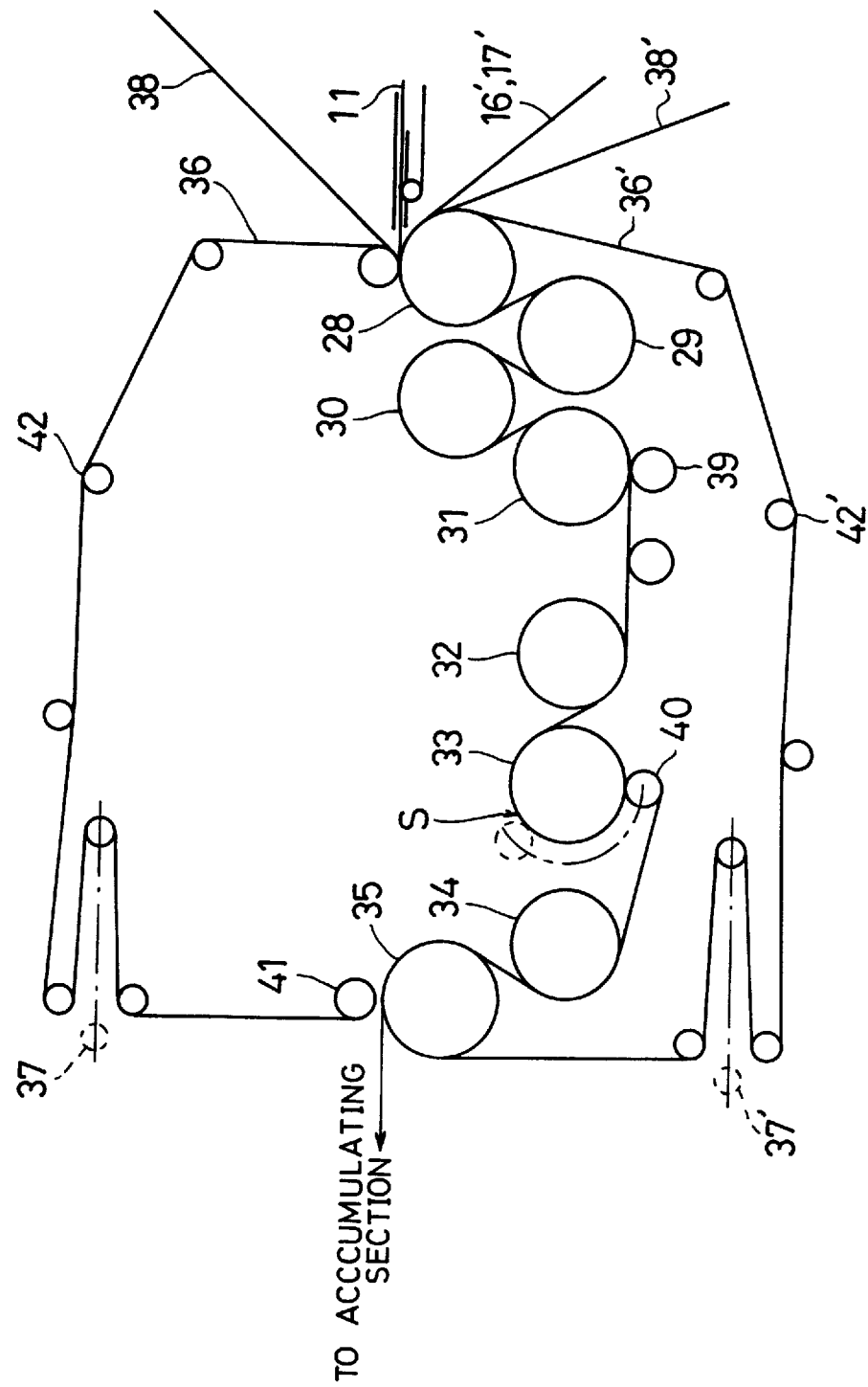
FIG. 8 is a simplified front view of a laminating section in the preparation apparatus of FIG. 1.

Referring next to FIG. 8, the laminating section is constructed of heating rollers 28–31, cooling rollers 32–35, upper and lower endless belts 36, 36', and upper and lower dancer rollers 37, 37'. Between the heating roller 31 and the cooling roller 32, an auxiliary roller can be arranged to prevent slacking of the endless belts 36, 36'.

The cut sheets 11, the continuous sheets 16', 17' and upper and lower webs 38, 38' are held between the upper and lower endless belts 36, 36' and in a form of clinging together with the endless belts 36, 36' to the heating rollers 28–31, are heated alternately at upper and lower surfaces thereof. As the upper and lower webs 38, 38', the followings can be used in general: non-woven fabrics made of polyethylene terephthalate, polypropylene, a polyethylene terephthalate-polypropylene blend, nylon or the like; felts of polyethylene terephthalate, polypropylene, a polyethylene terephthalate-polypropylene blend, nylon or the like; films, sheets, and various foamed sheets produced from various resins; various urethane sheets, wood-base sheets, metal foils of aluminum, copper or iron; metalized resin films or sheets; decorative films or sheets of various textiles, papers and fabrics; and combinations thereof.

As a heating temperature, it is desired to heat the stacked assembly of the cut sheet 11, the continuous sheets 16', 17' and the webs 38, 38' (hereinafter called merely the "stacked assembly" for the sake of brevity) so that the temperature at each surface under melt welding reaches the melting point of the matrix resin or higher when the stacked assembly has reached the nip roll 39. Because heating at an unduly high temperature results in flowing of the resin and disorientation of the reinforcing fibers due to a reduction in the viscosity of the resin and also leads to a deterioration of the resin, the ultimate temperature may be in a range of from 160° to 180°C., preferably in a range of from 165° to 175° C. where the matrix resin is polypropylene.

The stacked assembly is then fed out to the cooling rollers while joining it into an integral unit under pressure.

The nip pressure at this stage varies depending on the matrix resin, thickness, volume content of the reinforcing resins, and the like of the resin sheets. However, when the resin sheets contain polypropylene as their matrix resin and have a thickness of 200 $\mu$m and a reinforcing fiber content of 70% by volume, the nip pressure generally ranges from 0.01 to 10 kg/cm, with a range of 0.1 to 1 kg/cm being preferred.

In a form of clinging to the cooling rollers 32–35, the stacked assembly is then cooled alternately at upper and lower surfaces thereof as in the heating section. As a cooling temperature, it is desired to cool the stacked assembly so that the temperature at each melt-welded surface reaches the hardening point of the matrix resin or lower when the stacked assembly has reached a correcting roller 40. Further, the cooling temperature in the vicinity of a guide roller 41 where the endless belts 36, 36' are peeled off from the thus-obtained laminated sheet varies somewhat depending on the matrix resin and the material and surface conditions of the endless belts 36, 36'. It is however desired to set the cooling temperature so that the temperature at an interface between each endless belt and its adjacent resin sheet becomes equal to or lower than the hardening point of the matrix resin of the resin sheet.

The correcting roller 40 around which the endless belts are wrapped can be moved along a circumferential wall of the cooling roller 33. By intermittently or continuously moving the correcting roller 40 so that the area of contact between the laminated sheet and the cooling roller is changed, the position where the matrix resin reaches its solidification temperature can be shifted. This makes it possible to correct any upward or downward warp of the laminated sheet. Upon moving the correcting roller 40, the endless belts 36, 36' slack. Their slacks can be taken up by the dancer rollers 37, 37' arranged in association with the upper and lower endless belts, respectively. Further, these dancer rollers 37, 37' also serve to control the tensions of the upper and lower endless belts 36, 36' constant.

According to the above-described lamination method, it is necessary to individually control the tensions of the upper and lower endless belts 36, 36'. Incidentally, these tensions substantially vary depending on the material, width, overall length and the like of the endless belts 36, 36'.

To correct meandering of these endless belts 36, 36', guide rollers 42, 42' are disposed as edge position controllers. To practice this belt-meandering correction method, steering rollers are adopted in the illustrated embodiment. It is however to be noted that the meandering-correction method varies depending on the material of the endless belts and is not limited to the use of such steering rollers.

As described above, any upward or downward warp of the laminated sheet is corrected by moving the correcting roller 40 to adjust the angle over which the laminated sheet is caused to cling to the cooling roller 33. This warp correction method will hereinafter be described in further detail.

In general, upon preparation of a single-layer or laminated multilayer sheet of a thermoplastic resin, the sheet may develop curling (i.e., a warp) depending on the properties of the resin and the preparation conditions. This warp of the sheet poses a problem upon working or using the sheet, thereby leading to a defective final product in many instances. It may be contemplated to correct the warp of the sheet by a plurality of heating and cooling rollers with which the sheet is brought into contact over a fixed area of contact. To accommodate varied amounts of correction required for warps, however, it is necessary to change the temperature of each cooling roller so that the temperatures of the front and rear sides of each resin sheet remain equal to each other. This temperature change of each cooling roller takes place with a time lag, so that a prompt response is not feasible. It may also be contemplated to measure any remaining warp after correction of a warp and then to feed it back to change cooling conditions. This method cannot achieve any prompt response, either.

The present inventors have found that application of a stress, which is opposite to that required to produce a warp on a laminated sheet, makes it possible to cancel an internal stress and hence to bring the laminated sheet into straight configurations. Described specifically, the present inventors have found that the problem of warping can be overcome by cooling a laminated sheet having a warp on a circumferential wall of a cooling roll, said circumferential wall having a configuration opposite in direction to the warp, so that the laminated sheet is cooled to the solidification temperature of its thermoplastic resin or lower, that is, by continuously changing the area of contact between the cooling roll and the laminated sheet so that a position on the circumferential surface of the cooling roller, where the thermoplastic resin impregnated in the laminated sheet reaches its solidification temperature, can be moved as desired.

The operation of the correcting roller 40 will next be described with reference to FIGS. 9A and 9B, in which there are shown the cooling roller 33, the correcting roller 40, a correcting-roller-moving motor 43, gears 44, 45, a correcting-roller-moving frame 46, a cooling medium feeding/discharging port 47, and a chain sprocket 48.

As it became necessary to move the correcting roller along the circumferential wall of the associated cooling roller in the course of the development of the present invention, the present invention has adopted a method in which rotation of the correcting-roller-moving motor 43 is converted into movement of the correcting roller via the gears 44, 45.

The gear 45 and the correcting-roller-moving frame 46 are fastened together by bolts. Rotation which has been transmitted from the correcting-roller-moving motor 43 is transmitted to the gear 45 via the gear 44 so that the gear 45 is caused to rotate integrally with the correcting-roller-moving frame 46. It is therefore possible to move the correcting roller 40 along the circumferential wall of the cooling roller 33.

The cooling roller 33 is driven via the chain sprocket 48, and a bearing is arranged between a shaft of the cooling roller 33 and the gear 45. Therefore, turning motion of the gear 45 and the correcting-roller-moving frame 47 is not interfered with rotating drive force transmitted from the chain sprocket 48.

It is therefore possible to eliminate a warp of a laminated sheet by wrapping the endless belts 36, 36' around the correcting roller 40 and moving the correcting roller 40 to adjust an angle over which the endless belts 36, 36' are caused to cling to the cooling roller 33, namely, a time of contact therebetween as described above.

A description will now be made about warping with reference to FIGS. 10A and 10B. Assume that in a sample of laminated sheet, sides A-D and B-C extend in parallel with an advancing direction of the laminated sheet while sides A-B and D-C extend at right angles relative to the advancing direction of the laminated sheet. The sample is placed on a horizontal table and vertical lines are drawn from four corners A,B,C,D onto the horizontal table. Points of intersection between the vertical lines and the horizontal table are designated a, b, c and d, respectively. An average of a distance $L_1$ between A and a, a distance $L_2$ between B and b, a distance $L_3$ between C and c and a distance $L_4$ between D and d is defined as a warp L of the sample. According to the present invention, L can be controlled in a range of from 0 to 3 cm. A value of L greater than 3 cm means a warp which is so large that the laminated sheet is inconvenient for use. In the present invention, a sample of 25 cm×25 cm is supposed to be cut out.

Incidentally, the correcting roller is required to achieve delicate movement and adjustment so that as the correcting-roller-moving motor, adoption of a motor of a type such as a variable speed motor, for example, is suited.

EXAMPLE 1

Employed as fiber-reinforced thermoplastic resin sheets in this Example were wound sheets of 650 mm in width manufactured by Mitsui-Toatsu Chemicals Inc. ("PREGLON P30-PN", trade name). A continuous sheet was formed by juxtaposing two of the wound sheets so that a laminated sheet of 1,300 in width would be obtained. Further, a laminating angle was set at 0°/90° and as a forming condition, a laminating speed was set at 15 m/min.

Cut sheets had a cut length of 1,300 mm. A let-off cycle of the cut sheets was calculated as:

$$0.65 \text{ (m)} \times 60 \text{ (sec)} / 15 \text{ (m)} = 2.6 \text{ (sec)}$$

- .... cycle time
- .... laminating speed
- .... conversion into seconds
- .... width of wound sheet A feed-out speed at the cut-sheet let-off section was therefore 48 m/min.

Further, the feeding speed by the belt conveyor 9 can be determined under conditions such as those shown in FIG. 11.

Referring to FIG. 11, the speed $V_2$ of the belt conveyor can be represented by the following formula:

$$V_2 = HV_1/(H-E)$$

where
- $V_1$: preparation speed;
- E: distance between a rear end of a cut sheet 49 fed before and a front end F of a trailing cut sheet 50 at the moment that the trailing cut sheet has been placed on the belt conveyor 9;
- H: distance between the front end F of the trailing cut sheet 50 at the moment that the trailing cut sheet has been fed onto the belt conveyor 9 and a position G where the cut sheets 49 and 50 are brought into abutment at mutually-proximal end faces thereof.

Under the above experimental conditions, $$E = 0.2 \text{ (m), and } H = 2.1 \text{ (m)}.$$

Since the laminating speed is 15 m/min, the speed of the belt conveyor 9 is:

$$V_2 = 16.57 \text{ m/min}.$$

A laminated thermoplastic resin sheet held between the endless belts 36, 36', which are each made of a TEFLON-impregnated glass cloth (thickness: 0.3 mm×2 layers), is heated by the group of heating rollers 28–31, specifically by the first heating roller 28, the second heating roller 29, the third heating roller 30 and the fourth heating roller 31, whereby the impregnated resin was molten in toto. The tension of each endless belt is controlled at 30 kg/m. The respective heating rollers are set at temperatures so that the impregnated resin is molten in toto. The preset temperature varies depending on the kind of the laminated thermoplastic resin sheet. In the case of a polypropylene sheet containing glass fibers in an amount of 70% by volume (thickness: 0.2 mm×2 layers), the preset temperature is about 210° C.

The laminated thermoplastic resin sheet is heated to a predetermined temperature as described above. In the case of a polypropylene sheet containing glass fibers in an amount of 70% by volume, the polypropylene sheet is heated until the temperature of the laminated surface arises to about 170° C.

To ensure the melting of the resin which makes up the laminated thermoplastic resin sheet, the nip roller 39 is used in association with the fourth heating roller 31.

The nip pressure at this time is set at 0.5 kg/cm. An unduly high pressure results in flowing of the resin and disorientation of the reinforcing fibers.

The laminated thermoplastic resin sheet whose heating has been completed as described above is next cooled by the group of cooling rollers 32–35, specifically by the first cooling roller 32, the second cooling roller 33, the third cooling roller 34 and the fourth cooling roller 35. The preset temperature of each cooling roller varies depending on the kind of the laminated thermoplastic resin sheet. In the case of a polypropylene sheet containing glass fibers in an amount of 70% by volume, the preset temperature is about 40° C. Incidentally, the heating rollers 28–31 and the cooling rollers 32–35 employed in this Example are 400 mm in diameter×1,600 mm in length (effective length: 1,400 mm).

The laminated thermoplastic resin sheet is cooled to a predetermined temperature as described above. In the case of a polypropylene sheet containing glass fibers in an amount of 70% by volume, the polypropylene sheet is cooled until the temperature at the interfacial boundary between the sheet and each belt drops to about 70° C.

By adequately changing the position of the correcting roller arranged in association with the second cooling roller 33 and changing the area of contact between the cooling roller and the laminated thermoplastic resin sheet, the laminated thermoplastic resin sheet is prevented from developing a warp.

Through the above-described steps, the laminated thermoplastic resin sheet was obtained without a warp. A warp of a sample of 25 cm×25 cm was 2.0 cm. The thickness ratio of a joint portion where a continuous sheet and each of cut sheets were joined together to a non-joint portion where the above-described sheets were just superposed, t'/t, was 0.93 at the minimum. Further, during production of the laminated sheet, no molten resin stuck on the belts, the rollers or the like.

Figure 12:
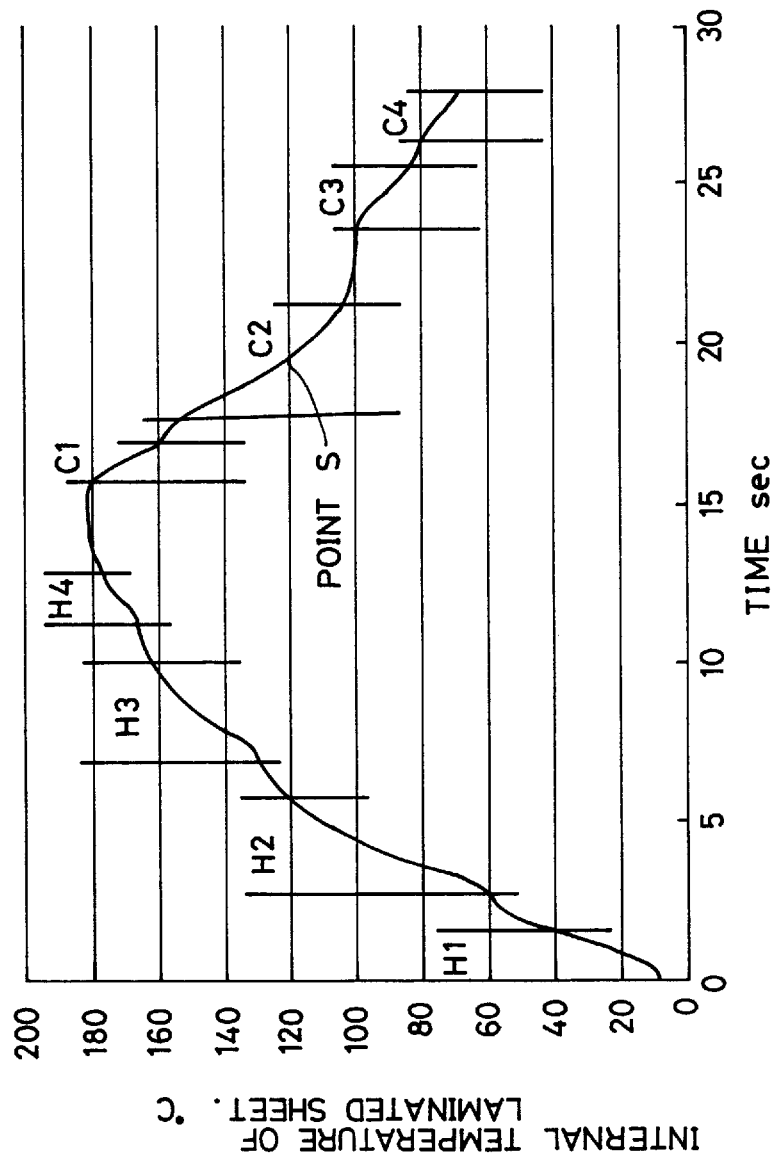
FIG. 12 is a diagram illustrating, by way of example, variations of the temperature of a surface of a laminated thermoplastic resin sheet as a function of time.

In this experiment, the internal temperature of the laminated sheet was measured. The results are shown in FIG. 12. As is also appreciated from the diagram, the position where the internal temperature of the laminated sheet reaches the solidification point of 120° C. (point S) is located on the second cooling roller. Specifically, the above position appears as point S on the cooling roller 33 in FIG. 8.

The internal temperature of the laminated sheet was measured by applying a thermocouple into a clearance between the sheets which were to be laminated.

Comparative Example 1

Preparation of a similar laminated sheet without such an anti-warping measure will be described with reference to FIG. 13.

Figure 13:
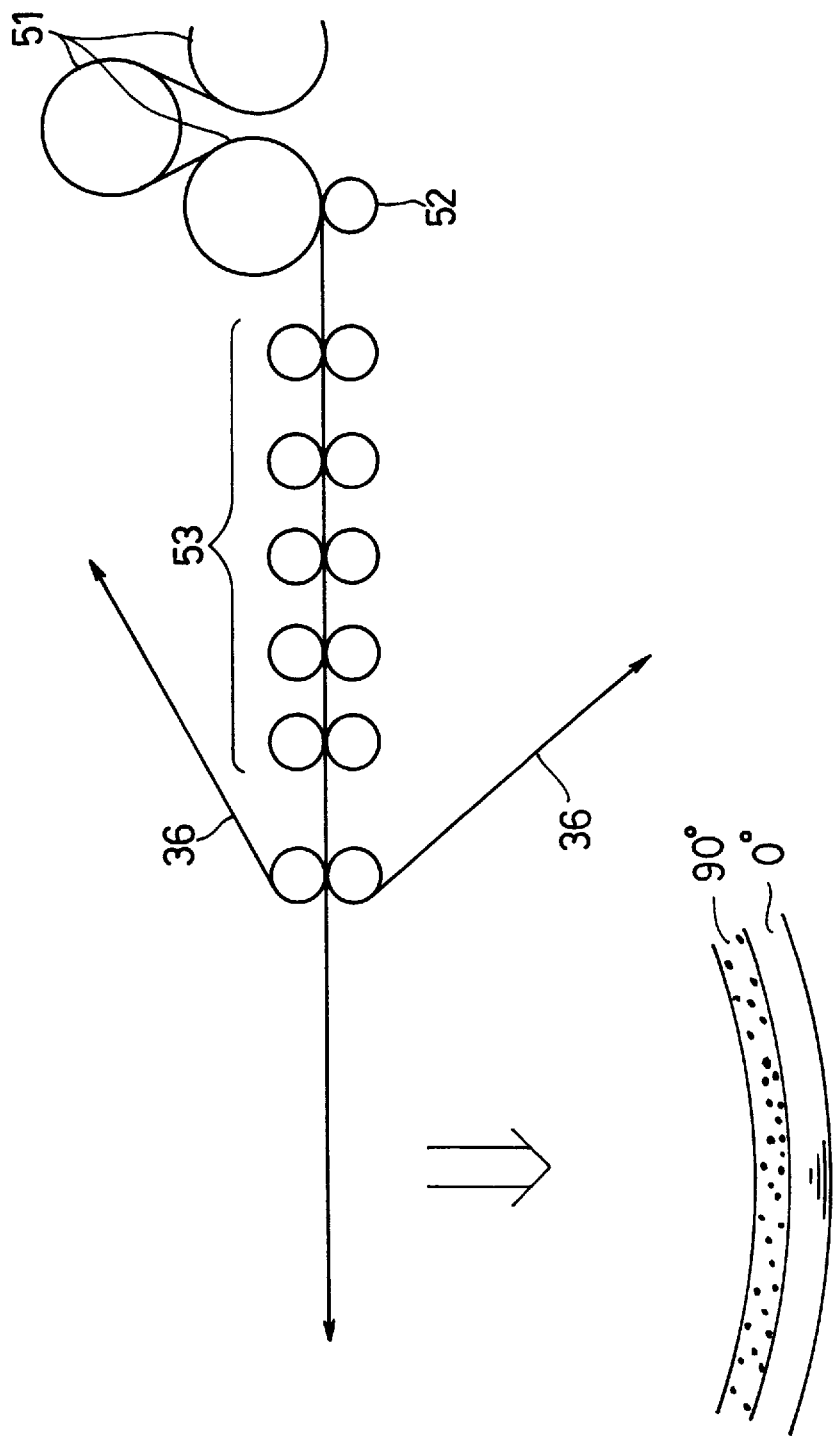
FIG. 13 is a simplified front view of heating rollers and cooling rollers, which also illustrates in cross-section a laminated thermoplastic resin sheet to show the form of a warp occurred thereon.

As is illustrated in FIG. 13, a laminated sheet which had been heated by plural heating rollers 51 and joined under pressure by a nip roller 52 was drawn out straight, followed by cooling and hardening through a group of cooling rollers 53. The lamination structure of the laminated sheet was in the form of 90° layer/0° layer. As fiber-reinforced thermoplastic resin sheets, "PREGLON P30-PN" sheets (trade name; product of Mitsui-Toatsu Chemicals Inc.) were used.

In this Comparative Example, the laminated sheet was caused to curve so that it presented a concave surface due to a difference in shrinkage rate between the layers. A warp of a sample cut out in dimensions of 25 cm×25 cm was as large as 6.5 cm.

What is claimed is:

1. A preparation process of a laminated sheet, comprising:

successively cutting a fiber-reinforced thermoplastic resin sheet into a plurality of cut sheets each having a predetermined dimension, said resin sheet having been obtained by forming continuous fibers into a sheet with the fibers oriented in one direction and then impregnating the oriented fiber sheet with a thermoplastic resin;

successively feeding the cut sheets into a butting apparatus and bringing adjacent end faces of the cut sheets into abutment against each other without any space therebetween while aligning corresponding cut end faces of the cut sheets together, said cut sheets being passed through a space between a belt conveyor, which is arranged before a laminating section and which is driven at a speed higher than a laminating speed of the laminating section, and a lifting prevention element disposed above said belt conveyor to cause the cut sheets to pass with a difference in speed between each preceding cut sheet and a trailing cut sheet to bring a front end face of the trailing cut sheet into abutment against a rear end face of the preceding cut sheet to obtain a butted cut sheet group;

feeding the cut sheet group and a continuous sheet, which is another fiber-reinforced thermoplastic resin sheet and is caused to run in a superposed relationship with the cut sheet group, into the laminating section and causing the cut sheet group and the continuous sheet to cling to a heating roller, whereby the cut sheet group and the continuous sheet are subjected to melt welding;

supporting and joining under pressure the melt-welded cut sheet group and continuous sheet between nip rollers;

causing the joined cut sheet group and continuous sheet to cling to a cooling roller to cool and harden the joined cut sheet group and continuous sheet and passing the joined cut sheet group and continuous sheet between said cooling roller and a correcting roller while moving the correcting roller along said cooling roller so that the amount of contact arc of the joined cut sheet group and continuous sheet with said cooling roller is changed to adjust the amount of warp of the joined cut sheet group and continuous sheet, whereby the joined cut sheet group and continuous sheet are subjected to total welding to continuously prepare a laminated sheet.

2. The preparation process according to claim 1, wherein the cut sheets and the continuous sheet are continuously stacked together with the fiber orientation of the cut sheets being shifted from the fiber orientation of the continuous sheet by an angle in the range of 45 degrees to 135 degrees.

3. The preparation process according to claim 1, wherein the fiber-reinforced thermoplastic resin sheet has a thickness not smaller than 30 µm but not greater than 500 µm and has a fiber content not lower than 30% but not higher than 85% by volume.

4. The preparation process according to claim 1, wherein the fibers in the cut sheets are fibers selected from the group consisting of glass fibers and carbon fibers, and the thermoplastic resin in the cut sheets is a resin selected from the group consisting of poly-propylene resin, polystyrene resin, and polyethylene resin.

5. The preparation process according to claim 1, wherein second and third fiber-reinforced thermoplastic resin sheets are fed to the laminating section from an upper side and a lower side of the cut sheets, respectively, by endless belts, the second and third sheets are caused to cling to the heating roller together with said endless belts so that the second and third sheets are subjected to melt welding and joining to the cut sheets under pressure via said endless belts; the second and third sheets being caused to cling to the cooling roller together with said endless belts, thereby cooling and hardening the second and third sheets; and the laminated sheet is then peeled off from said endless belts.

6. The preparation process according to claim 1, wherein a device for feeding continuous webs from an upper side and a lower side of the cut sheets, respectively, is arranged before said laminating section to feed into said laminating section the cut sheets, the continuous sheet and at least one of the webs in a lamination structure, the lamination structure being selected from the group consisting of (upper web/cut sheets/continuous sheet), (upper web/cut sheets/continuous sheet/lower web), and (cut sheets/continuous sheet/lower web).

7. The preparation process according to claim 1, wherein the position of said correcting roller is moved along said cooling roller by converting rotation of an electric motor into rotation of said correcting roller via gears.

8. The preparation process according to claim 1, wherein the fibers in the continuous sheet are fibers selected from the group consisting of glass fibers and carbon fibers, and the thermoplastic resin in the continuous sheet is a resin selected from the group consisting of poly-propylene resin, polystyrene resin, and polyethylene resin.

9. A preparation process of a laminated sheet, comprising:

successively cutting a fiber-reinforced thermoplastic resin sheet into a plurality of cut sheets each having a predetermined dimension, said resin sheet having been obtained by forming continuous fibers into a sheet with the fibers oriented in one direction and then impregnating the oriented fiber sheet with a thermoplastic resin;

successively feeding the cut sheets into a butting apparatus and bringing adjacent end faces of the cut sheets into abutment against each other without any space therebetween while aligning corresponding cut end faces of the cut sheets together, said cut sheets being passed through a space between a belt conveyor, which is arranged before a laminating section and which is driven at a speed higher than a laminating speed of the laminating section, and a lifting prevention element disposed above said belt conveyor to cause the cut sheets to pass with a difference in speed between each preceding cut sheet and a trailing cut sheet to bring a front end face of the trailing cut sheet into abutment against a rear end face of the preceding cut sheet to obtain a butted cut sheet group;

feeding the cut sheet group and plural continuous sheets, which are additional fiber-reinforced thermoplastic resin sheets and have been caused to run side by side in a relationship superposed with the cut sheet group, into the laminating section with adjacent side faces of the plural continuous sheets being brought into abutment against each other, and causing the cut sheet group and the continuous sheets to cling to a heating roller, whereby the cut sheet group and the continuous sheets are subjected to melt welding;

supporting and joining under pressure the melt-welded cut sheet group and continuous sheets between nip rollers;

causing the joined cut sheet group and continuous sheets to cling to a cooling roller to cool and harden the joined cut sheet group and continuous sheets and passing the joined cut sheet group and continuous sheets between said cooling roller and a correcting roller while moving the correcting roller along said cooling roller so that the amount of contact arc of the joined cut sheet group and continuous sheets with said cooling roller is changed to adjust the amount of warp of the joined cut sheet group and continuous sheets, whereby the joined cut sheet group and continuous sheets are subjected to total welding to continuously prepare a laminated sheet.

10. The preparation process according to claim 9, wherein the cut sheets and the continuous sheets are continuously stacked together with the fiber orientation of the cut sheets being shifted from the fiber orientation of the continuous sheets by an angle in the range of 45 degrees to 135 degrees.

11. The preparation process according to claim 9, wherein the fiber-reinforced thermoplastic resin sheets have a thickness not smaller than 30 $\mu$m but not greater than 500 $\mu$m and have a fiber content not lower than 30% but not higher than 85% by volume.

12. The preparation process according to claim 9, wherein the fibers in the cut sheets are fibers selected from the group consisting of glass fibers and carbon fibers, and the thermoplastic resin in the cut sheets is a resin selected from the group consisting of poly-propylene resin, polystyrene resin, and polyethylene resin.

13. The preparation process according to claim 9, wherein the adjacent side faces of the continuous sheets, running side by side, are individually detected; let-off shafts for the continuous sheets are moved in parallel with each other to make the adjacent side faces of the continuous sheets register with a reference line to thereby bring the adjacent side faces of the continuous sheets into abutment against each other; and the continuous sheets are then continuously fed into said laminating section with one of said let-off shafts being held in a fixed position and with the side face of the continuous sheet corresponding to the other let-off shaft being maintained in a butted relationship with the adjacent side face of the continuous sheet corresponding to said one let-off shaft in the fixed position.

14. The preparation process according to claim 9, wherein two of said plural fiber-reinforced thermoplastic resin sheets are fed to the laminating section from an upper side and a lower side of the cut sheets, respectively, by endless belts, the two sheets are caused to cling to the heating roller together with said endless belts so that the two sheets are subjected to melt welding and joining to the cut sheets under pressure via said endless belts; the two sheets being caused to cling to the cooling roller together with said endless belts, thereby cooling and hardening the two sheets; and the laminated sheet is then peeled off from said endless belts.

15. The preparation process according to claim 9, wherein a device for feeding continuous webs from an upper side and a lower side of the cut sheets, respectively, is arranged before said laminating section to feed into said laminating section the cut sheets, the continuous sheets and at least one of the webs in a lamination structure, the lamination structure being selected from the group consisting of (upper web/cut sheets/continuous sheets), (upper web/cut sheets/continuous sheets/lower web), and (cut sheets/continuous sheets/lower web).

16. The preparation process according to claim 9, wherein the position of said correcting roller is moved along said cooling roller by converting rotation of an electric motor into rotation of said correcting roller via gears.

17. The preparation process according to claim 9, wherein the fibers in the continuous sheets are fibers selected from the group consisting of glass fibers and carbon fibers, and the thermoplastic resin in the continuous sheets is a resin selected from the group consisting of poly-propylene resin, polystyrene resin, and polyethylene resin.

* * * * *